Aug. 16, 1949.   A. T. BARAGER   2,478,890
FLEXIBLE SHAFT COUPLING
Filed Dec. 10, 1946   3 Sheets-Sheet 1
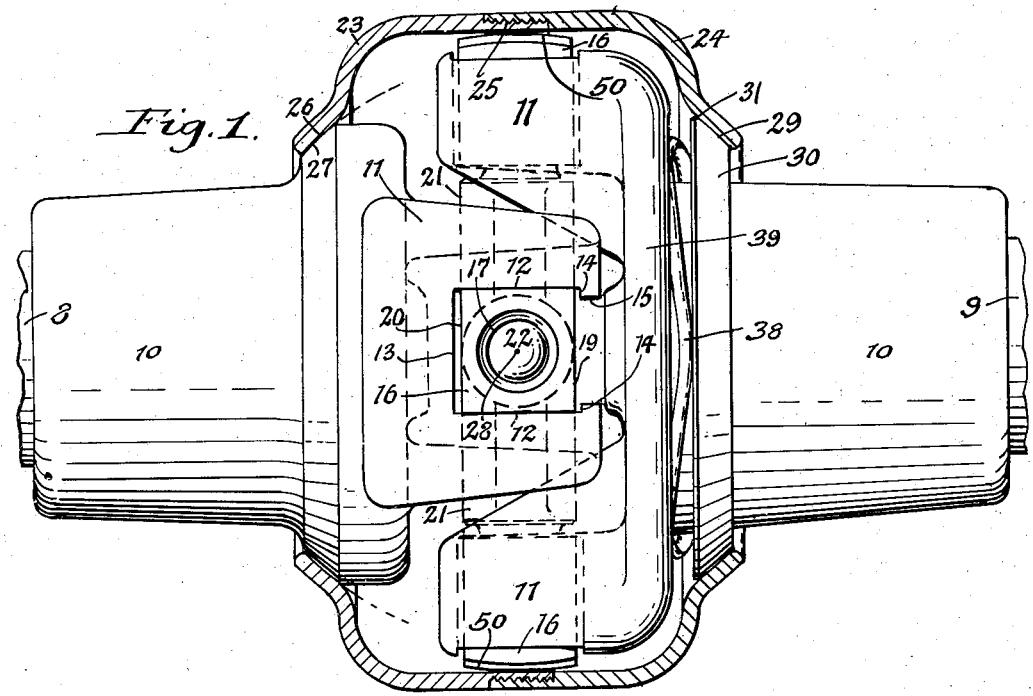
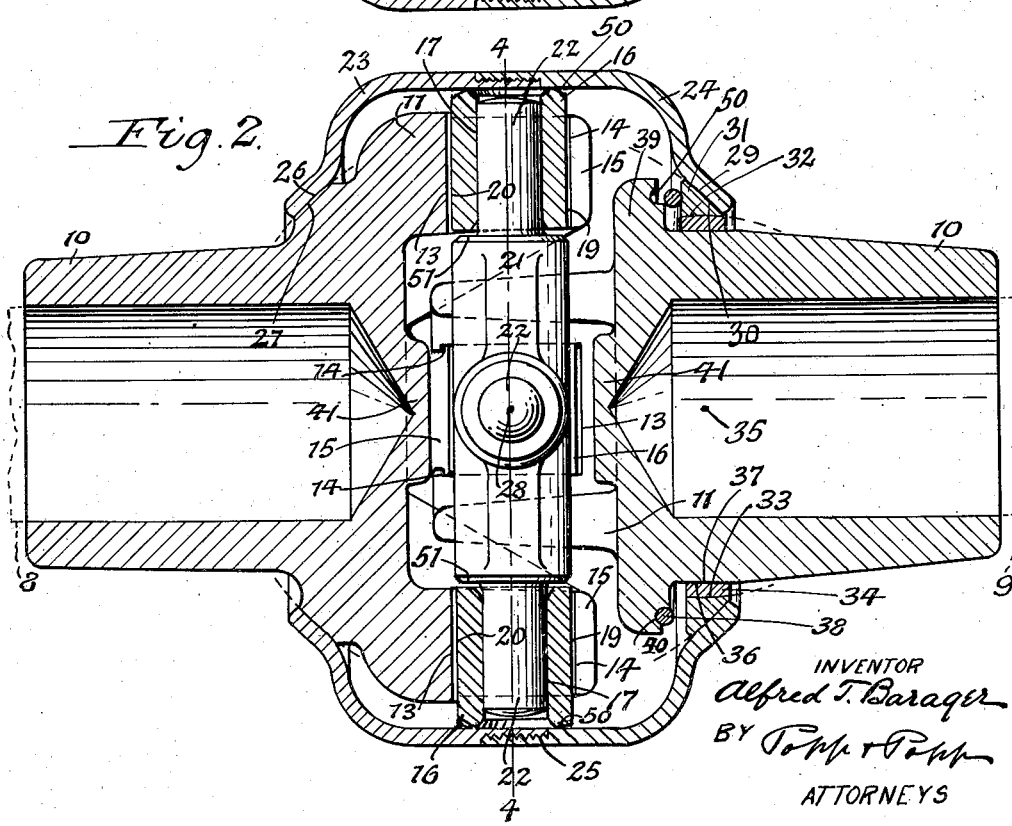
INVENTOR
Alfred T. Barager
BY Popp & Popp
ATTORNEYS

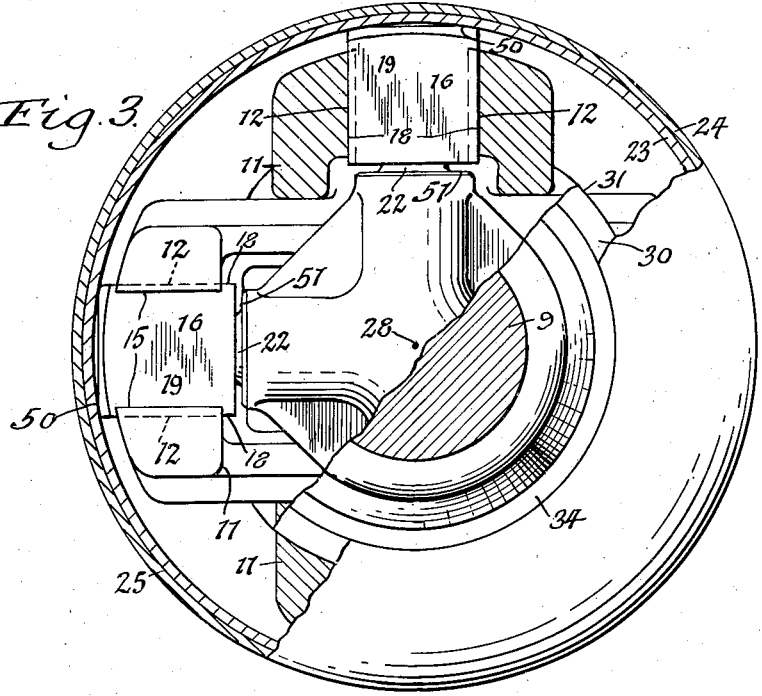

Aug. 16, 1949.  A. T. BARAGER  2,478,890
FLEXIBLE SHAFT COUPLING
Filed Dec. 10, 1946  3 Sheets-Sheet 3
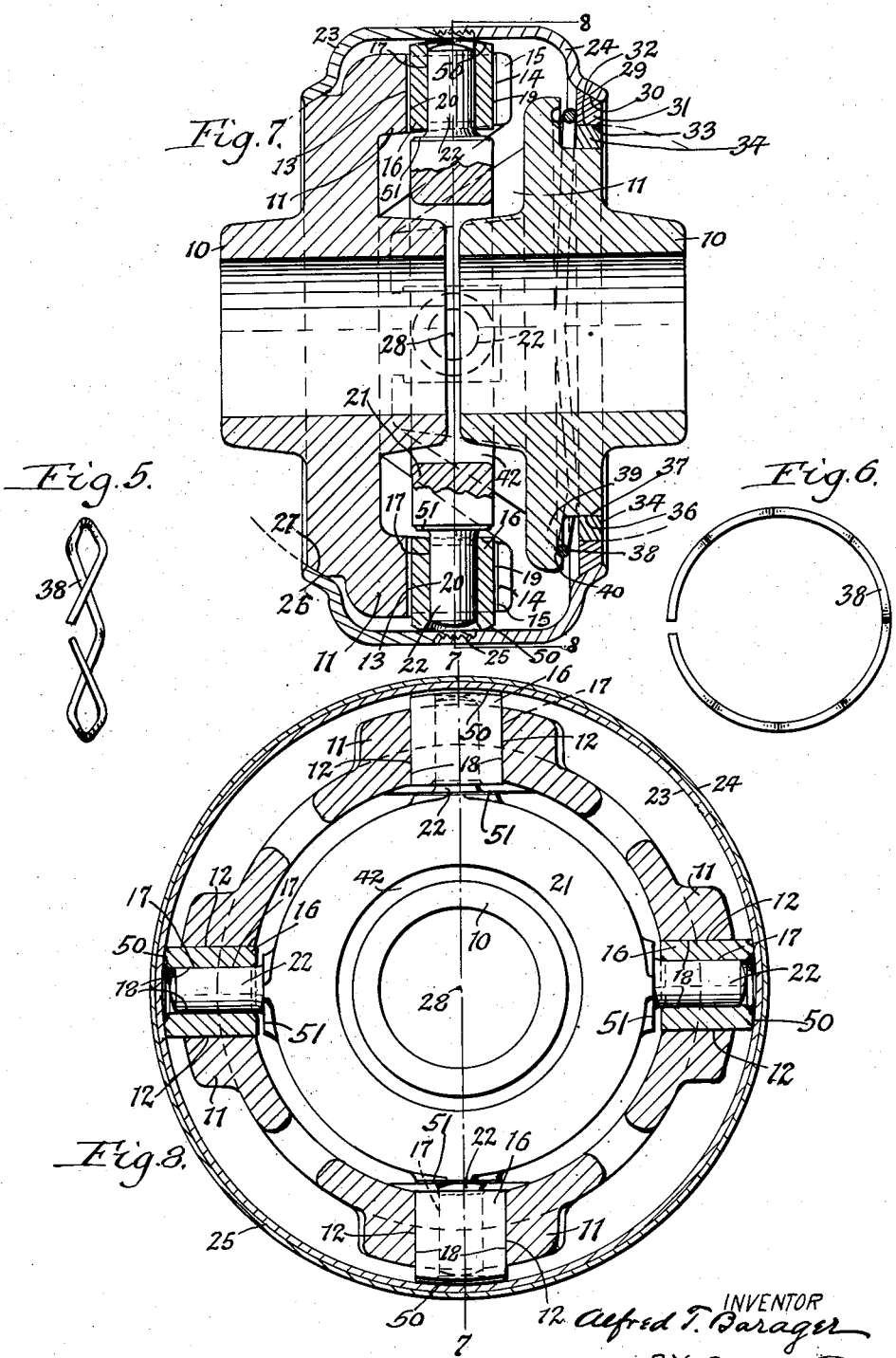
INVENTOR
Alfred T. Barager
BY Popp & Popp
ATTORNEYS Patented Aug. 16, 1949

2,478,890

UNITED STATES PATENT OFFICE 2,478,890

FLEXIBLE SHAFT COUPLING

Alfred T. Barager, Buffalo, N. Y.

Application December 10, 1946, Serial No. 715,171

3 Claims. (Cl. 64—17)

This invention relates to a flexible shaft coupling which is more particularly designed for operatively connecting two shafts which are slightly out of axial alinement and permit of transmitting motion from one of these shafts to the other without producing any binding or heating action or undue wear on the parts.

One of the objects of this invention is to provide a shaft coupling which is compact and sturdy in construction and which includes no screws, nuts or pins that are liable to get loose and only one internal spring for yieldingly holding some of the parts in position.

Another object of this invention is to provide an enclosure for the coupling which protects the working parts from dust and dirt and also has a relatively smooth exterior and no depressions, thereby avoiding collecting of foreign matter and also eliminating any humming effect which would be liable to occur if any air pockets existed on the exterior of the enclosure.

A further object of this invention is to construct the enclosure that the same also serves to hold a lubricant which is supplied to the working parts and enables them to operate without appreciable friction or wear.

A still further object of this invention is to so organize the several parts that lost motion between the same is avoided and vibration is reduced to a minimum.

In the accompanying drawings:

Fig. 1 is a plan view of a shaft coupling embodying this invention and showing the enclosing casing in section.

Fig. 2 is a longitudinal section of the same taken on line 2—2, Fig. 4.

Fig. 3 is an end view of the coupling partly broken away.

Fig. 4 is a transverse section taken on line 4—4, Fig. 2.

Fig. 5 is an edge view of the spring forming part of the means for sealing the enclosing casing of the coupling.

Fig. 6 is a front view of the same.

Fig. 7 is a longitudinal section of a modified form of this invention which is somewhat more compact lengthwise than the construction shown in Figs. 1-4 and taken on line 7—7, Fig. 8.

Fig. 8 is a transverse section taken on line 8—8, Fig. 7.

In the following description similar reference characters indicate like parts in the several figures of the drawings.

Referring to the construction shown in Figs. 1-4, the numerals 8, 9 represent two shafts which have their corresponding ends arranged substantially end to end and which are adapted to be connected by the coupling of this invention so that motion can be transmitted from one shaft to the other when the same are in alinement or somewhat out of alinement.

This coupling comprises two coupling heads which oppose each other and each of which includes a rear tubular hub 10 which is secured to the end of one of the shafts in any suitable manner and two longitudinal coupling arms 11 projecting forwardly from the front end of this hub on diametrically opposite sides of the same. In the assembled position of the two coupling heads, the arms of one head are arranged in the spaces between the arms of the other head and the several arms of both heads are spaced in equal quarters in a circumferential row around the axes of these shafts.

Each of the coupling arms is provided on its front end with a radial guideway having preferably the form of a guide opening which is rectangular in cross section and provided with two circumferentially opposite guide walls or faces 12 which are parallel with a radial line from the axis of the respective hub, a rear stop wall or surface 13 and two front stop surfaces 14 arranged on opposite sides of a slot 15 formed in the front wall of this opening. By providing the front side of the guideway in each coupling arm with a radial slot it is possible to machine this guideway easily and at less cost than if the same were made in any other way, such as broaching or casting.

Within each of these guide openings is arranged a guide block 16 which is provided centrally with a radial bearing opening 17 and on its circumferentially opposite sides with two parallel guide faces 18 which slidingly engage the guide faces 12 of the guide opening in the respective arm, and front and rear stop faces 19, 20 adapted to engage the front and rear stop surfaces 13, 14 on said arm.

Between the two coupling heads is arranged a spider having a body 21 which is preferably cross-shaped and provided with four pivot pins or trunnions 22 which project radially outward and are arranged equidistant in an annular row around the body. Each of these pivot pins is journaled in the bearing opening 17 of one of the guide blocks so that during the use of this coupling each bearing block and the respective pivot pins are capable of turning relative to one another and the block and pivot pin can also slide radially one relative to the other. Each block and its pivot pin are compelled to rotate bodily in unison about the axes of the shafts due to engagement of the circumferentially opposite sides 18 of the bearing block with the guide faces 12 of the coupling arms but this block and pivot pin are free to move lengthwise in the guide opening in the respective coupling arm if the shafts move lengthwise toward and from each other, the extent of such movement being limited by the front and rear stop faces 13, 14 on this arm. By these means rotation of one shaft is transmitted to the other and several parts are free to adjust themselves relatively the required extent if the shafts are not in exact alinement and thus avoid cramping and heating as well as eliminating undue wear and cost of maintenance.

Means are provided for enclosing the working parts of this coupling so as to protect the same of the injurious effects of dust and dirt and also to permit of lubricating these parts so as to maintain the same in the best working condition. In their preferred construction these protecting means are constructed as follows:

The numerals 23 and 24 represent two cup-shaped casing sections which together form a casing of substantially globular form which encloses the adjacent parts of the heads and the spider of the coupling and the parts mounted thereon. These casing sections are detachably connected by means of a screw joint 25 between the inner peripheral edges and the same are provided, respectively, on their outer sides with central openings which receive the inner parts of the hubs of the coupling heads. A tight joint is provided between this enclosing casing and the hubs of the coupling heads so as to exclude dust from the interior of the casing and the working surfaces of the coupling and also permit of filling the casing with grease or the like for lubricating the working surfaces and prevent the lubricant from leaking to the exterior of the casing. This is preferably accomplished by providing sliding joints between the opposite ends of the casing and the hubs which in their preferred form are constructed as follows:

The numeral 26 represents an annular concave sliding surface formed on the edge of the central opening in the casing section 23 and engaging with an annular convex sliding surface 27 on the inner part of the hub 10 of the coupling head which is connected with the shaft 8, which surfaces are curved and form part of a sphere, the axis of which is located at the center 28 of the spider, thereby forming a universal joint which permits the shaft 8 and the parts connected therewith to turn in all directions without disturbing or opening the joint between the casing and the hub on the shaft 8.

On the inner side of the central opening of the other casing section 24 the same is provided with an annular concave sliding surface 29 which engages with an annular convex sliding surface 30 on an outer closure or sealing ring 31. The cooperating sliding surfaces 29, 30 form part of a sphere, the axis 28 of which is located in the center of the spider so that the joints between the outer sides of both casing sections and the respective parts of the coupling are concentric and cause the parts to be capable of turning universally in all directions in the manner of a ball and socket joint.

The bore of the outer closure or sealing ring 31 is provided with an annular concave sliding surface 32 which engages with an annular convex sliding surface 33 on the periphery of an inner closure or sealing ring 34 which surrounds the adjacent inner part of the hub 10 of the other coupling head. The curvature of the cooperating sliding surfaces 32, 33 form part of a sphere, the center of which is located on the longitudinal axis of the shaft 9 and the coupling head mounted thereon, as shown at 35 in Fig. 2. By these means the shaft 9 is free to incline laterally in all directions relative to the spider and the enclosing casing without causing any binding or cramping action between the respective parts and still maintain the casing leak-tight and prevent any lubricating grease therein from escaping.

The bore 36 of the inner closure or sealing ring 34 is cylindrical and is capable of sliding lengthwise on the cylindrical periphery 37 of the hub 10 secured to the shaft 9 and thus permit this inner closure ring to adjust itself to suit the changes in the relative position of the shaft 9 and the casing.

The outer sealing ring 31 is yieldingly held in engagement with the casing by spring means consisting preferably of an annular deformed spring 38 which surrounds the hub 10 attached to the shaft 9 and bearing with its outer side against the inner side of the outer sealing ring 31 while its inner side bears against the outer side of an annular flange 39 on the hub 10 of the head which is attached to the shaft 9. This flange is preferably provided with an annular groove 40 which receives the inner part of the spring 38 and holds the same in a central position. As the spring 38 presses the outer sealing ring 31 outwardly, it carries the inner sealing ring 34 with it, due to the interlocking effect of the spherical joint surfaces between the same, thereby insuring sealing the casing at this place against leakage.

During the rotation of the flexible coupling together with the shafts which it connects the guide blocks are thrown outwardly by centrifugal force at which time the same slide radially on the coupling arms 11 and their outward radial movement is limited by engagement of the outer ends of the guide blocks with the inner side of the longitudinal central part of the enclosing casing. In order to permit these guide blocks to thus engage the enclosing casing and still enable the two coupling heads to turn freely in all directions relative to one another while adapting themselves to any misalinement therebetween when in operation, each of the guide blocks 16 has its outer end provided with a spherical convex rounded face 50 the axis or center of which is located at the center or middle 28 of the spider, thereby permitting the outer ends of the guide blocks 16 to turn, slide freely in all directions in engagement with the inner side of the enclosing casing, and limit the radial outward movement of the guide blocks without causing any binding or cramping action against the same.

When considerable space is available between the opposing ends of the two shafts 8 and 9 which are to be coupled, the inner ends of the hubs 10 of the coupling heads may be closed by a web 41, as shown in Fig. 2, in which case the coupling may be made of comparatively small diameter, but when the ends of the shafts are close together, the inner ends of the hubs 10 may be left open and project into an opening 42 in the center of the spider, and the coupling may be made of larger diameter, as shown in Figs. 7 and 8. In other respects the two forms of couplings are substantially alike in construction and operation and the foregoing description therefore applies equally to both of them.

The guide blocks 16 are compelled to turn bodily with the coupling heads about the longitudinal axis of the coupling by engagement of each pair of guide side faces 12 on the coupling arms with the circumferentially opposite side faces 18 of each guide block, as shown in Figs. 1, 3 and 4, but each of the guide blocks is free to move lengthwise of the axis of the coupling between these side faces 12 and thus compensate for play or slack which may occur between the opposing end of the shafts due to any longitudinal movement of these shafts relative to one another which may occur during the operation of the same. This manner of mounting the guide blocks 16 on the coupling heads also permits the same to assume an angular position relative to one another when the axes of the shafts are not in exact alinement but are arranged at an angle to one another. To permit of such longitudinal rocking and sliding movement of the guide blocks 16 between the side guide faces 12, the outer and inner stop faces 13 and 14 of each coupling arm are spaced from corresponding inner and outer faces 19 and 20 of the respective guide block and thus provide the required clearance necessary for this longitudinal movement of the guide block relative to the respective coupling arm. The stop faces 13 and 14 also serve to maintain the guide blocks 16 in an assembled position on the coupling arms while handling the parts in the course of manufacture.

In order to maintain the spider in a central position relative to the coupling heads and associate parts and thus prevent the coupling from becoming unduly unbalanced while rotating, the spider is provided with an annular row of stop faces 51 which are preferably formed around the inner parts of the trunnions 22, as shown in Figs. 2, 3 and 4, and adapted to engage the inner ends of the guide blocks in the event that the spider is thrown radially by centrifugal force during the rotation of the coupling.

From the foregoing description it will be noted that due to the sliding action of the guide blocks 16 on the guide faces 12 the two shafts are compelled to turn in unison at all times, thereby avoiding any jolting or hammering action when starting or stopping rotation of the shafts and coupling.

Inasmuch as the outer ends of the guide blocks are spherical and bear against the inner side of the casing due to centrifugal force when the shafts are rotating, these blocks always assume their proper position in accordance with the relative angularity between the shafts.

Moreover any lateral movement of one shaft relative to the other is permissible by the trunnions sliding endwise in the respective guide block, this movement being limited by the shoulders 51 on the spider engaging with the inner ends of the guide blocks.

Outward movement of the guide blocks is limited by engagement of the same with the inner side of the casing and lengthwise movement of the shafts is governed by the clearance between the inner and outer sides of the guide blocks and stop faces 13 and 14 on the coupling arms 11.

It is to be particularly noted that in this coupling friction between the several parts is virtually eliminated and thus allows the two shafts which are connected by this coupling to turn in their respective bearings with a minimum of friction, thereby avoiding undue wear on the parts and reducing the cost of maintenance accordingly.

As a whole this coupling is very strong and capable of readily transmitting the heaviest loads from one shaft to another without liability of giving way. The same is also so organized that the same is capable of use in places where only a limited amount of room is available and the same can also be easily disassembled for inspection, adjustment and repairing if this should be necessary at any time.

I claim as my invention:

1. A coupling for connecting two relatively movable rotatable members, comprising two coupling heads adapted to be connected, respectively, with said members and each head having radial guideways which are spaced circumferentially from like guideways on the other head, guide blocks slidable radially on said guideways, a spider arranged between said heads and having radial trunnions on which said guide blocks are capable of turning and also sliding radially, and a casing enclosing said heads and spider and mounted on said heads, the outer end of each of said guide blocks being rounded and engaging with the inner side of said casing.

2. A coupling for connecting two relatively movable rotatable members, comprising two coupling heads adapted to be connected, respectively, with said members and each head having radial guideways which are spaced circumferentially from like guideways on the other head, guide blocks slidable radially on said guideways, a spider arranged between said heads and having radial trunnions on which said guide blocks are capable of turning and also sliding radially, and a casing enclosing said heads and spider and mounted on said heads, the outer end of each of said guide blocks being of spherically rounded convex form, the axis of which is located at the center of said spider.

3. A coupling for connecting two relatively movable rotatable members, comprising two coupling heads adapted to be connected, respectively, with said members and each head having radial guideways which are spaced circumferentially from like guideways on the other head, guide blocks slidable radially on said guideways, a spider arranged between said heads and having radial trunnions on which said guide blocks are capable of turning and also sliding radially, and a casing enclosing said heads and spider and mounted on said heads, and said guide blocks engaging their outer ends with the inner side of said casing and said spider being provided with stop shoulders which are adapted to engage with the inner ends of said guide blocks and thereby limit the lateral movement of said spider relative to said heads.

ALFRED T. BARAGER.

REFERENCES CITED

The following references are of record in the file of this patent:

UNITED STATES PATENTS

| Number | Name | Date |
| --- | --- | --- |
| 135,404 | Cathcart | Feb. 4, 1873 |
| 1,313,109 | Ofeldt | Aug. 12, 1919 |
| 2,346,058 | Waldron | Apr. 4, 1944 |

FOREIGN PATENTS

| Number | Country | Date |
| --- | --- | --- |
| 515,424 | Germany | 1931 |